Figure 4:
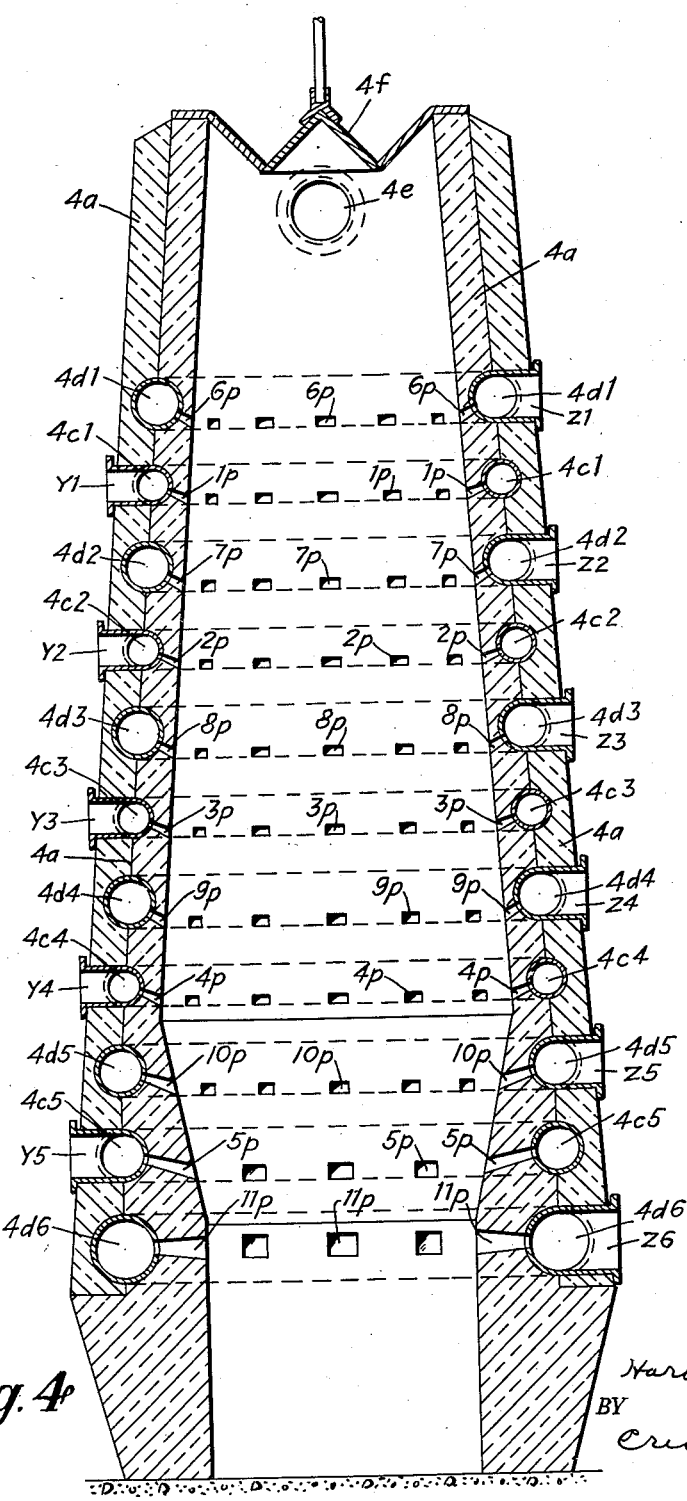

Dec. 15, 1931. H. R. BERRY 1,836,005
PROCESS FOR THE HEAT TREATMENT AND REDUCTION OF ORES
Filed June 4, 1928 3 Sheets-Sheet 1
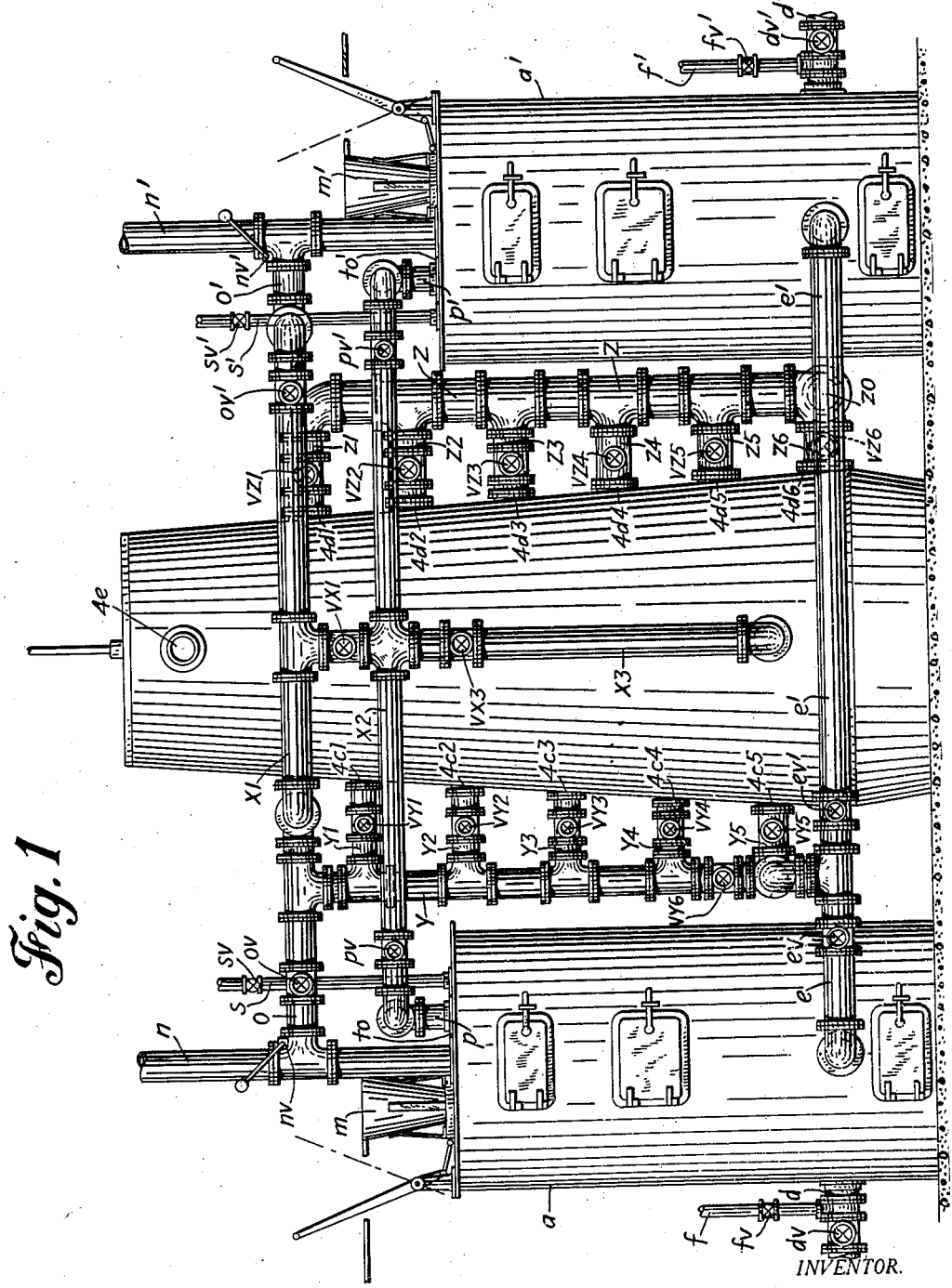
INVENTOR.
Harold R. Berry
BY
Crichton Clarke
ATTORNEY.

Dec. 15, 1931.   H. R. BERRY   1,836,005
PROCESS FOR THE HEAT TREATMENT AND REDUCTION OF ORES
Filed June 4, 1928   3 Sheets-Sheet 2
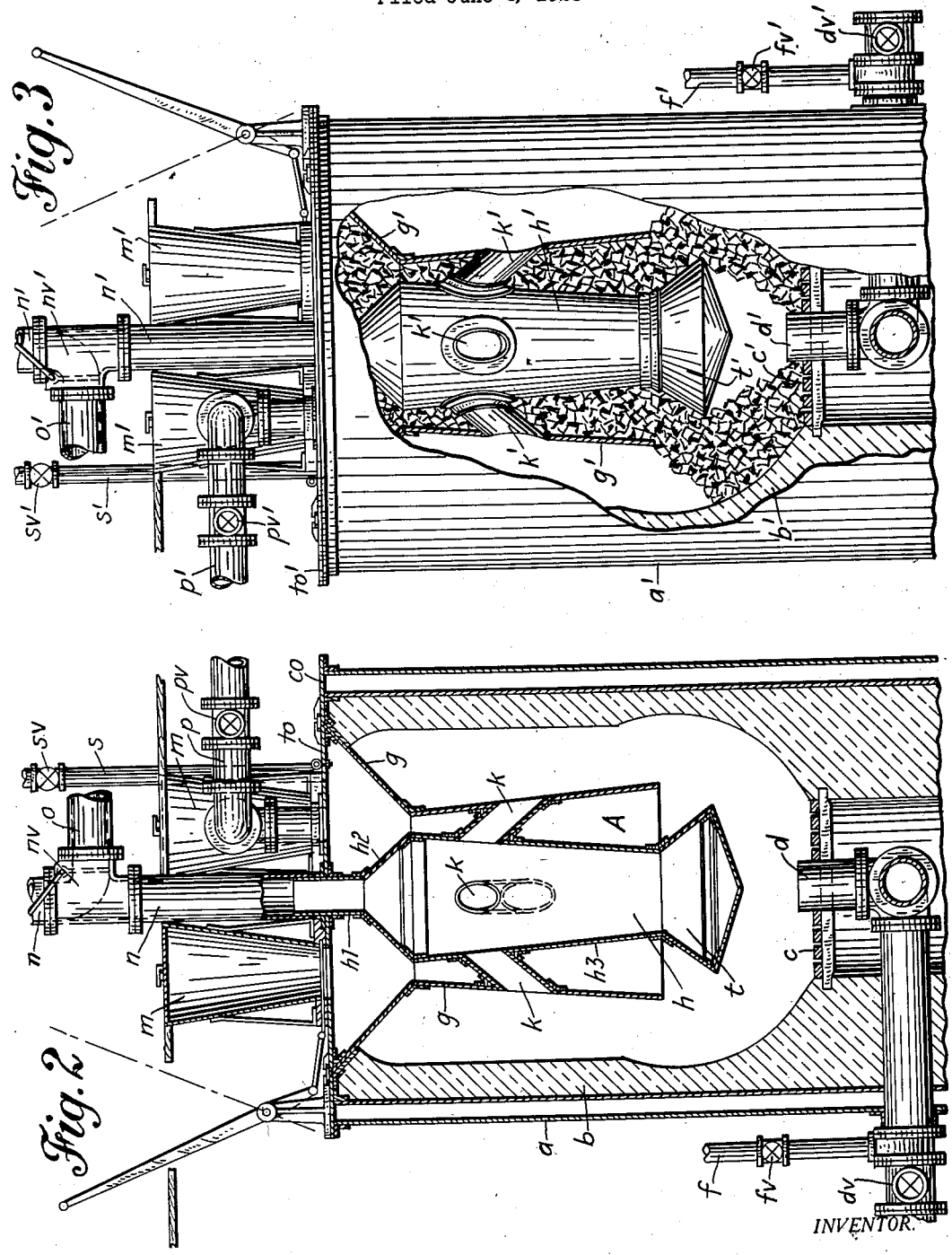
INVENTOR.
Harold R. Berry
BY Crichton Clarke
ATTORNEY.

Patented Dec. 15, 1931

1,836,005

UNITED STATES PATENT OFFICE

HAROLD R. BERRY, OF BROOKLYN, NEW YORK

PROCESS FOR THE HEAT TREATMENT AND REDUCTION OF ORES

Application filed June 4, 1928. Serial No. 282,514.

The present application is a continuation in part of the subject matter contained in U. S. Patent No. 1,672,054, issued June 5th, 1928.

The object of this invention is to effect certain improvements in processes and apparatus for the heat treatment and reduction of ores through the use of combustible gas.

The process disclosed herein contemplates the use of any natural or artificial combustible gas, or combinations of these; provided, however, that there be present in the gas or be derivable therefrom, either or both, carbon monoxide or hydrogen, in sufficient quantities to serve the purpose of the process.

In operation of the process, reducing gases are made available in the gas supplied and smelting heats are obtained through its combustion. Few combustible gases contain sulphur to any such extent as it occurs in coke; and the removal of sulphur from such gases is inexpensive and common practice, whereas coke may not be so purified commercially. Sulphur, occurring in pig-iron, due to its introduction into the smelting operation as a constituent of the fuel used, is materially reduced in amount.

Methods of using the process include recovery in the blast furnace of latent heat now carried away in the blast furnace gases, which become chiefly useful for regenerative purposes. Use of the process improves the general character of pig-iron, not only by reducing the sulphur content, but by removal from the smelting operation, of the large quantities of incandescent carbon from the coke, which contribute to the carbon absorption of the molten metal.

Fixed carbon contacting oxide ore, at proper temperatures, produces reaction to carbon oxides and reduction of the metal; but, at much lower temperatures, with greater penetration, more intimate contact and increased efficiency, carbon monoxide reacts with metallic oxides to carbon dioxide. The latter reaction also occurs in coke fed blast furnaces, but the carbon monoxide is derived by the reaction of carbon dioxide, resulting from carbon combustion, with carbon, at high temperature. Carbon monoxide, so derived, is at the expense of the sensible heat, which represents a cost to produce, that it absorbs as an endothermic formation heat. Thus it is, that all the reducing energy of the carbon monoxide of a coke fed blast furnace is obtained at the cost of fuel consumed in combustion with air; whereas, the present process, without absorbing its heat of formation, from the smelting zone, to produce carbon monoxide, produces outside said zone, such carbon monoxide quantities for the reducing phase of the smelting operation.

A method for operating the present process includes the heat treatment and gasification of the primary fuel to be used. Such fuel may be solid carbonaceous material or it may be liquid in character and of high, low or intermediate viscosities, or a combination of these. The gasified fuel may be fractionated and hydrocarbons of high heat value delivered to the blast furnace in the neighborhood of the boshes, while carbon monoxide and hydrogen constituents of the gas, may be delivered higher up the stack for reducing purposes and combustion, with air, for heat production, of percentages not converted to carbon dioxide and water vapor in reducing the ore.

In the region of highest temperatures, above the tuyères of the common blast furnace construction, reactions involving the gangue of the ore are most occurent. In certain of the reactions and physical readjustments happening in this region, involving lime applied as flux, silicon, manganese and phosphorus, carbon enters in its native or fixed state. In using the present process such carbon is not supplied from coke, but is available from carbon precipitated from heavy hydrocarbons of the gas when they are delivered into the zone of maximum temperatures.

When the present process is so applied as to include treatment and gasification of the fuel used, important economies ensue.

The highest thermal values of a solid fuel are in the hydrocarbons which occur in the volatile fractions. In using coke for blast-furnace fuel these heat values are not recovered in the smelting operation but are diverted to various by-products and auxiliary uses, or are lost.

By present practice, coal is heated by the combustion of something of value; by this economic expenditure, the coal is devolatilized and its highest valued thermal constituents driven off. Whereupon, the residual carbon and ash, constituting coke, is at high temperature and is cooled off for handling, thereby dissipating the sensible heat content. In the blast furnace, part of the coke is then combusted to restore the heat so dissipated, which combustion is attained by air blasting with air quantities in excess of complete combustion requirements; resulting, in exit from the operation of more sensible heat, together with actual carbon extraction from the coke, occuring as carbon monoxide in the blast furnace gases. To the loss must also be added the thermal value of the carbon monoxide of the exhaust gases, as the entire latent as well as sensible heat of the blast furnace gases are equated in heat balance against the sensible operating heats of the blast furnace.

In burning carbon to $CO_2$, the heat generated is sufficient to react carbon dioxide and carbon to carbon monoxide. The result is the invariable occurrence of monoxide quantities in combustion products from solid fuel. The composition of producer gas is due to these reactions, and but for the carbon monoxide utilized by the blast furnace for reducing purposes, it would be producer gas exiting through the downcomer.

In using gaseous fuel, as prescribed by the present process, when $CO_2$ is produced and the reaction heat made available for use, the thermal yield is not reduced, through heat absorption in the formation of carbon monoxide by the subsequent reaction of the dioxide with fixed carbon.

Use of the sensible heat of exhaust gases for regenerative purposes is included within the present process, but the purpose is to utilize within the blast furnace, the latent thermal values now occurrent in blast furnace gases; and to recover for use in smelting operations, the heat value of the volatile of the fuel as well as that of the coking fraction. By the process, gaseous reducents are directly supplied to the blast furnace operations, without absorption of the sensible heat, incident to their production; and air is introduced to combust and obtain the heat value of such of these quantities as are not reacted in reducing processes.

Description of apparatus and its functions

In the accompanying drawings, there is shown an assembled apparatus and enlargements in detail of its units, constituting a mechanism and method for operation of the process presented.

In the accompanying drawings, like reference numerals indicate corresponding parts in the different figures of the drawings.

Fig. 1, shows in graphic elevation an apparatus assembly, representing a mechanism, with pipes, valves and connections operatable by the process, in which is illustrated a common type of blast-furnace and two gas generators, similar in general construction and principle of operation to the apparatus shown in United States Letters Patent No. 1,672,052 issued June 5th, 1928. Fig. 2 is a cross-section elevation of the left hand gas-generator, shown in Fig. 1. Fig. 3, partly in cross-section and partly in sketch, shows an elevation of the right-hand gas generator shown in Fig. 1. Fig. 4 shows a cross-section elevation of the blast-furnace illustrated in Fig. 1.

In the designating symbols for the different parts of the drawings, all valves include a "$v$" in their designations and, in sequences of by-pass pipes, the designating symbol for each such pipe contains a numeral, indicative of its place in the sequence.

In Fig. 1, reading from left to right there is illustrated a gas-generator, a blast-furnace and a gas-generator, similar to the unit to the left. ($a$) represents the shell construction of the left hand gas generator; ($d$), an air-blast line; ($dv$), a shut-off valve on pipe ($d$); ($e$), a pipe connecting with ($d$) and leading outside the gas generator; ($ev$), a shut-off valve on pipe ($e$); ($f$), a steam line; ($fv$), a shut-off valve on pipe ($f$); ($to$), the top cover for the left hand gas-generator; ($m$), a fuel hopper on top of the left hand gas-generator, communicating by sliding trap with its interior; ($n$), a flue communicating with the interior of the left hand gas generator; ($o$), a by-pass from flue ($n$); ($ov$), a shut-off valve on pipe ($o$); ($nv$), a two way damper, directing stack flow either continuously through stack ($n$) or through by-pass ($o$); ($p$), a pipe leading from the interior of the left hand gas generator; ($pv$), a shut-off valve on pipe ($p$); ($s$), a steam pipe leading into the left hand gas generator; ($sv$), a shut-off valve on pipe ($s$). The right hand unit, shown in Fig. 1, represents a second and similar gas generator as the one described and located to the left.

Corresponding parts of the right-hand gas generator are symboled the same as the unit shown to the left, with the addition of a ($'$). In Fig. 1, (X1) represents a pipe connecting the by-pass pipes ($o$) and ($o'$); (X2), a pipe connecting pipes ($p$) and ($p'$) beyond their respective valves, ($pv$) and ($pv'$); (VX1), a shut-off valve communicating between pipes (V1) and (X2); (X3), a pipe entering within the blast furnace illustrated, at its lower terminus and, at its upper end, connecting, through shut-off valve (VX3) with pipe (X2); (Y), a vertical pipe, extending downward from pipe (X1), with laterals (Y1), (Y2), (Y3), (Y4) and (Y5) leading within the blast furnace illustrated, controlled respectively by shut-off valves, (VY1), (VY2), (VY3), (VY4) and (VY5); (VY6), a shut-off valve in pipe (Y); (Z), an air-line, connecting at its base with the furnace air supply at (ZO), and having laterals leading into the blast-furnace illustrated, (Z1), (Z2), (Z3), (Z4), (Z5) and (Z6), equipped respectively with shut-off valves, (VZ1), (VZ2), (VZ3), (VZ4), (VZ5) and (VZ6); (4e), exit to the downcomer of the blast furnace.

In Fig. 2, (b) represents insulation material; (c), a fire-grate; (d), an air-blast pipe; (dv), a shut-off valve on pipe (d); (f), a steam line; (fv), a shut-off valve on pipe (f); (co), a coping, formed of a ring of sheet metal, united by angle iron to a small conic, resting atop of and attached to the shell structure (a) and insulating material (b), forming a beveled, circular entrance from the top into the interior of gas-generating unit (Fig. 2); (to), the top cover for gas-generating unit (Fig. 2), to which is attached upon its lower side the outer wall, (g), of a fuel magazine, the latter being formed of two conic metallic sheets united at their minor circumferences by angle iron; (h), a hollow bottle-shaped figure formed, by union with angle irons, of heavy pipe section (h1), conic metallic sheet section (h2) and conic metallic sheet section (h3), (h) being attached by angle iron, as shown, to the lower surface of top (to), the heavy pipe (h1), passing through top (to); (k), any one of four pipes passing through fuel magazine (A), formed by the space bounded by the interior surface of (g) and the exterior surface of (h); (m), either of the two fuel hoppers on top of generator (Fig. 2) communicating by sliding trap with the interior of magazine (A); (n), a flue communicating with the interior of hollow figure (h); (o), a by-pass from flue (n); (nv), a two-way damper, directing stack flow either continuousy through stack (n) or through by-pass (o); (ov), a shut-off valve on by-pass (o); (p), a pipe connecting the interior of fuel magazine (A), through top (to) with space outside generator (Fig. 2); (pv), a shut-off valve on pipe (p); (s), a steam pipe, communicating with the interior of fuel magazine (A), through top (to); (sv), a shut-off valve on pipe (s); (t), a blast deflector, formed of sheet material and angle iron, located above the outlet of blast pipe (d) and attached by angle iron to the lower part of bottle-shaped unit (h).

Fig. 3, represents a second and similar unit to that shown in Fig. 2. It is shown in Fig. 1, as the right hand unit of the assembly. Corresponding parts of Fig. 3 are described under Fig. 2, above, and are likewise symboled, with the addition of a (').

Fig. 4 is a drawing, in cross-section, representing a common type of blast furnace, of which (4a) represents the insulated confining walls; (4c1), (4c2), (4c3), (4c4), (4c5), a series of annular passages around the furnace and shown within the insulating material, equipped respectively with ports, (1p), (2p), (3p), (4p) and (5p), which communicate between the interiors of the respective annulars and the interior of the furnace; (4d1), (4d2), (4d3), (4d4), (4d5) and (4d6), a series of annular passages around the furnace and shown within the insulating material, sequentially alternating with the first above mentioned series; (6p), (7p), (8p), (9p), (10p), (11p), series of ports which communicate between the interiors of the last mentioned respective annulars and the interior of the furnace; (4e), exit to downcomer); (4f), bell; the annular (4d6), Fig. 4, is comparable with the bustlepipe of familiar construction, excepting that it is shown located within the insulating material of the furnace walls.

Ports (11p), Fig. 4, are not shown equipped with nozzles, but such equipment may be installed, not only to the ports communicating with annular (4d6), Fig. 4, but to any or all of the ports shown in Fig. 4, whether intended to convey gas or air, also, any or all of the annulars of Fig. 4 may be installed outside the furnace walls, after the fashion of bustle-pipes.

The apparatus of the drawings is not shown as the best adaption of the process, nor is a perfect functioning of the process claimed for the mechanism. The arrangement is shown as one of any number of constructions, which may incorporate in its operation the tenets of the subject process: all mechanisms so functioning being within the claims hereof.

The apparatus shown in the drawings is illustratively useful, as it may be operated by a number of methods, all included within the general scope of the present process. Simpler mechanisms enable use of the process by employing a single method of operation. The number and relative sizes of the annulars and ports, shown in Fig. 4, and of the pipes and connections shown in Fig. 1, may be varied in any manner which permits the process to function.

Pipe (z), Fig. 1, represents an air-line, preferably operated with preheated air, and is connected by by-passes, controlled by valves, leading into the blast furnace at different levels. Pipe (y), Fig. 1, represents a gas line, similarly communicating with the interior of the blast furnace at different levels, by means of by-passes, regulatable by valves.

A method for operating the blast furnace conformable with the present process consists in closing valves $(ov)$, $(ov')$ and $(ev)$, Fig. 1, and delivering combustible gas through pipe $(e')$, Fig. 1, through a connection, not shown, or via the right hand gas generating unit of Fig. 1. Such gas supply, regulatable by valve $(ev')$, Fig. 1, passes into the gas-line $(y)$, Fig. 1, where it is introduced, in desired quantities, into the blast furnace represented in Figs. 1 and 4, at the levels served by pipes, (Y1), (Y2), (Y3), (Y4) and (Y5), through regulation of valves (VY1), (VY2), (VY3), (VY4) and (VY5), Fig. 1, valve (VY6), Fig. 1, being open.

Air quantities, preferably at high temperature, are introduced into the air line $(z)$, Fig. 1, through inlet pipe $(zo)$, Fig. 1, and are delivered within the blast furnace represented in Figs. 1 and 4, in desired quantities at chosen levels through by-pass pipes (Z1), (Z2), (Z3), (Z4), (Z5) and (Z6), Fig. 1, by regulation of valves (VZ1), (VZ2), (VZ3), (VZ4), (VZ5) and (VZ6), Fig. 1. The blast furnace has been charged in customary manner with ore, for instance iron ore, and fluxing material, for instance lime, but fuel has been omitted from the charger. The gas used may be natural or artificial or a combination of these; but for efficient operation, a sufficient quantity of reducing gases, such as carbon monoxide and free hydrogen, must be present in the gas to serve the purposes of deoxidization incident to the smelting.

Combustion between the gas and air so delivered into the blast-furnace, represented in Figs. 1 and 4, is inaugurated and the delivery of both air and gas to the different levels of the furnace is regulated by the controlling valves to the initial combustion stage; which is, establishment of complete combustion, as nearly as possible, at all levels, with maximum delivery at the lowest level and decreasing quantities thereabove.

Initial heats may, also, be established by closing valve (VY6), Fig. 1, and valves (VZ1), (VZ2), (VZ3), (VZ4) and (VZ5), Fig. 1, whereby all combustion occurs in the region of the boshes.

Upon establishment of operative smelting heats; by regulation of the valves on the by-passes leading into the illustrated blast furnace from pipes $(y)$ and $(z)$, Fig. 1, intensive combustion is established at the lowest level, served by gas through pipe (Y5), Fig. 1, and by air through pipe (Z6), Fig. 1. At the higher levels insufficient air quantities are supplied for complete combustion of the gas there delivered. To the extent that air is available, combustion of the gas ensues with heat productions; to the extent that the gas is not combusted, the carbon monoxide and hydrogen constituents perform the function of reducents. Through one or more of the higher air inlets, (Z1), Fig. 1, (4d1), Fig. 4, for instance, full combustion air quantities are supplied for burning all combustibles remaining in the gas, so that their thermal values are devoted to the operations of the blast furnace.

By establishing the vertical series of combustion and reducing zones in the blast furnace, with intensive heat concentration in the region at the base of the stack, a condition prevails quite similar to that produced by the alternating layers, of solid fuel, ore and lime of common practice. Though carbon monoxide and free hydrogen have been referred to as the reducents present in combustible gases, nevertheless, certain hydrocarbons contacting hot metallic oxides, serve the same purpose and are included as reducents within the scope of the process. No change is suggested, from customary practice, respecting the other operations, of the blast furnace.

Another method for using the present process includes production of the gas to be used in the blast furnace.

To operate the gas generator, shown in Fig. 2, fuel the magazine (A), by delivering the fuel, from which gas is to be made, through hopper $(m)$ with the slide valve in the bottom of the hopper, open. Such fuel may be of any suitable carbonaceous material. The character of gas desired and the local price of available materials may govern the selection. Coke may be used and a water gas produced enriched with oil quantities added to the coke; bituminous coal or lignite may be used with or without the addition of liquid carbonaceous material.

Such fuel as is selected and fed into magazine (A) proceeds downward between the circular, confining walls of the magazine, upon the upper surface of blast deflector $(t)$ upon grate $(c)$, the declivity angle of the fuel preventing its entering blast pipe $(d)$. The fuel, so fed, finally occupies a space in the gas generator, shown in Fig. 2, similar to that shown as occupied by fuel in the twin gas generator shown in Fig. 3. When the gas generator shown in Fig. 2 is so fueled, the fuel atop grate $(c)$ is ignited, the air-blast is started through pipe $(d)$ by opening valve $(dv)$, all other valves in the pipings and connections attached to the generator are closed. Stack damper $(nv)$ is thrown to the position indicated in the drawings, Fig. 2, whereby pipe $(o)$ is cut off and flue $(n)$ is continuously open through and beyond damper $(nv)$.

The combustion products from the burning fuel pass, not into fuel magazine (A), but through lateral pipes $(k)$, into the interior of the hollow bottle-shaped unit $(h)$, thence through stack $(n)$.

The fuel atop grate $(c)$ and in the course of the blast is burned, that in the magazine is heated. When sufficient heat has been produced by the burning fuel to start devolatilization of the coal in the magazine, valve $(pv)$ on pipe $(p)$ is opened, whereby distillates from the magazine fuel are conducted outside the generator. When the combusting fuel within the generator has attained sufficient temperature for its reaction with steam to contain but small carbon dioxide percentages, valve $(dv)$ is closed and valve $(fv)$ on steam line $(f)$ is opened, whereby steam follows the path of the air blast and water gas, consisting chiefly of carbon monoxide and free hydrogen, is produced from carbon of the incandescent fuel.

The damper $(nv)$ in flue $(n)$ is thrown to horizontal position and the water gas is conveyed from the generator through pipe $(o)$. When heat absorption, incident to the production of the water gas, reduces the temperature of the reaction zone to a degree where carbon dioxide quantities in the water gas increase to undesired extent, the steam valve $(fv)$ is closed, blast valve $(dv)$ is opened, flue damper $(nv)$ is again swung to the vertical and the air-blast period of water gas production is on.

Successive repetition of the periods of air blasting and steam delivery constitute operation of the gas generator. Fuel consumed is automatically replenished from magazine (A), which, from time to time as required, receives fresh fuel from hopper $(m)$ by opening the sliding trap which constitutes the bottom of the hopper.

For a piece of fuel to arrive in the combustion zone in the neighborhood of grate $(c)$, it must travel from the hopper trap, the entire vertical length of the fuel magazine (A). During this journey, the occurrence of repeated air blasting periods, have virtually devolatilized the fuel to coke when it arrives for combustion or incorporation into gas in the reaction zone.

A method for using the subject process in operating the mechanical arrangement illustrated in Fig. 1, consists in timing the periods of the two gas generators, so that, while one is on air blast, the other is on gas making run. There results a continuous gas making operation.

Presume the left hand of the gas generators shown in Fig. 1 and detailed in Fig. 2, to be on air blast and the right hand generator of Fig. 1, detailed in Fig. 3, to be on gas making run. the positions of the valves are as follows: Fig. 1, open, $(dv)$, $(fv')$, $(pv)$, $(pv')$, $(ov)$, $(ov')$, (VX3), closed, $(dv')$, $(fv)$, (VX1) (VY6), $(ev)$, $(ev')$, with damper $(nv)$ vertical and damper $(nv')$ horizontal.

Volatiles from the fuel in magazine (A), Fig. 2, are being distilled through pipe $(p)$, Figs. 1 and 2, into pipe (X2), Fig. 1, in large quantities and, to a lesser extent, volatiles from the fuel in magazine (A'), Fig. 3, are emanating through pipe $(p')$, Figs. 1 and 3, into pipe (X2), Fig. 1. From pipe (X2), Fig. 1, the volatiles from both generators pass down pipe (X3), Fig. 1, and enter annular (4c5), Fig. 4.

The water gas being produced in the right hand generator of Fig. 1 (Fig. 3), rises through flue $(n')$, Figs. 1 and 3, is passed to pipe $(o')$, Fig. 1, by the horizontal position of damper $(nv')$, Figs. 1 and 3, and proceeds through pipe (X1), Fig. 1 into pipe (Y), Fig. 1.

There is thus available through regulation of valves (VY1), (VY2), (VY3) and (VY4), Fig. 1, and valves (VZ1), (VZ2), (VZ3), (VZ4), (VZ5) and (VZ6), Fig. 1, (see Fig. 4) in the lowest of the gas annulars (Y5), the hot hydrocarbon distillates from the fuel, and distributed upward in a sequence of layers, the water gas in gas annulars (4c1), (4c2), (4c3) and (4c4) and air combustion quantities, through air annulars (4d1), (4d2), (4d3), (4d4), (4d5) and (4d6). In regulating the blast furnace, full air combustion quantities for complete combustion are delivered the fuel distillates, insufficient air quantities, for complete combustion, are afforded the water gas in their upward, apportioned, sequential delivery into the blast furnace, but from the top-most air annular (4d1), Fig. 4, by pipe (Z1), Fig. 1, full combustion air quantities are delivered to consume all combustible material remaining in the gas at this point, as it journeys to exit (4e), Figs. 1 and 4, to the downcomer or other final exit provided. Thus it is, that the original fuel has been segregated into the intensely hot hydrocarbons of the volatile and carbon of the potential coke reacted to water gas; whereby, within the blast furnace, intense heat is established in the region of the boshes, gaseous reducements made available upward through the stack and combustibles remaining in the gaseous fuel ignited, leaving their heat value in the furnace in the neighborhood of the fresh ore and fluxing material.

In a bituminous coal analysis referred to in U. S. Letters Patent No. 1,672,052, issued June 5, 1928, there is shown the following:

*Pittsburgh Bed, Marianna 100 pounds*

| | Pounds | |
|---|---|---|
| Moisture | 1.44 | |
| Ash | 6.18 | |
| Fixed carbon | 57.77 | |
| Volatiles | | |
| O. | 7.61 | |
| C. | 20.99 | |
| $H_2$. | 5.23 | |
| S. | .78 | 34.61 |
| | | 100.00 |

From the above amount of coal with steam there is shown produced:

|  | Cu. ft. | B.t.u. per cu. ft. | Total B.t.u. |
|---|---|---|---|
| Hydrocarbon gases | 416 | 1381 | 573,952 |
| Water gas— CO, 753 cu. ft. $H_2$, 731 cu. ft. N. ec, 53 cu. ft. | 1537 | 312 | 483,784 |
| Total | 1953 |  | 1,057,736 |

57% of the above total thermal values, represented by the 570,000 B. t. u.'s of the coal volatile, by present practice, never enters the blast furnace; and occurrence of the reducent, carbon monoxide, in the blast furnace of present practice, is had, not by its introduction thereinto, but by producing it from the carbon of the coke, and to do this, sensible heat is absorbed, which was produced by the burning of fuel, exactly to the extent of the thermal value of the carbon monoxide produced. The last statement obtains where $CO_2$ and C are reacted to 2CO. When, because of low temperature or insufficient air supply, the fuel directly produces carbon monoxide, the result is the same, as carbon to carbon dioxide yields 14,544 B. t. u.'s to the pound of carbon, and one pound of carbon to carbon monoxide produces only 4,350 B. t. u.'s.

By present practice, the sensible heat in the coke product is lost; by the application of the subject process, last described, the sensible heat of the water gas product is delivered into the blast furnace, and this heat is around 1750° F.

By use of the process, the present fuel cost of smelting is well cut below one half, the operation is hastened and pig iron products are improved, because of the absence of the fixed carbon of coke to be absorbed by the metal.

In applying the process, in the manner last described, or in any other manner to which the comments apply, a relief gas holder, or holders, may be added to the equipment, to equalize the operation or for other purposes.

1. A single gas generator may be used and by conducting a proper part of the gas-make to the blast furnace and another part to temporary storage, a continuous gas supply to the blast furnace be maintained.

2. The gases may be made, stored and subsequently used.

3. Installation of appropriately located steam purge jets (not shown in the drawings) are advisable in any gas apparatus construction.

4. The whole or part of the steam for reaction purposes may be delivered into the generators, at any point, other than that indicated in the drawings, without departure from the process.

5. Through heat absorption by the fuel contained in the fuel magazines, reduces the temperatures of the conic boundary walls of the zones, nevertheless, an edging of carborundum or other suitable material at the bottom edge of the outside conic, where it contacts the fire-bed, will prolong the life of the interior structure of the generators.

6. It is not claimed in operation of the process that any apparatus will drive off all possible volatiles of the fuel nor completely exclude from the gas all products of combustion. The process includes the normal departures from perfect operation incident to any operation.

7.2. Oil which may be used with solid fuel in the gas-making, may be delivered at any desired point, within the fuel hoppers, directly into the fuel magazines or elsewhere.

8. Within the scope of the process, entrance may be made into the apparatus shown in Fig. 1, at any desired point and materials withdrawn as by-products or for other purposes.

9. The intensive air-blasting required for the best combustion of solid fuel is not required for complete combustion of gaseous fuel, proper contact with the equated oxygen amount suffices.

10. The withdrawal of devolatilized fuel, as a coke by-product from the gas-making operation, illustrated by operation of the mechanism shown in the drawings, is not a departure from practice of the process of this specification.

11. Oil delivered into the fuel magazines is subjected to increasing heat, which eventuates in causing destructive distillation, carbon deposited thereby joins the devolatilized coke fraction of the solid fuel and is reacted along with it, in the presence of steam, to water gas.

12. In all instances where gas or air are delivered into their respective annulars shown in Fig. 4, they enter therefrom, by their respective ports, into the interior of the blast furnace.

In the method of operating the apparatus shown in Fig. 1, as last described; when in the right hand generator of Fig. 1, (Fig. 2) the fuel bed temperature is reduced below desired intensity, by heat absorption in gas production, close valve $(fv')$ and open valve $(dv')$, Figs. 1 and 3, and close valve $(dv)$ and open valve $(fv)$ Figs. 1 and 2, and throw stack damper $(nv)$ Figs. 1 and 2, to the horizontal and stack damper $(nv')$ Figs. 1 and 3, to the vertical, whereupon the right hand generator of Fig. 1 (Fig. 3) is on air blast and the left hand generator of Fig. 1 (Fig. 2) is on gas making run. Thus, with periodic fuel replenishment from the fuel hoppers, and repetition of the operating cycle described, a continuous operation ensues, by which fuel volatiles and water gas are continuously fed to the blast furnace for use as described. With the gas generators so regulated to a continuous gas production:

1. Valves (VY1), (VY2), (VY3) and (VY4), Fig. 1, may be closed and the entire water gas production be delivered through valve (VY5), Fig. 1, into the lowermost gas annular of the blast furnace (4c5), Fig. 4, and thence through ports (5p), Fig. 4, into the blast furnace. By closing valves (VZ1), (VZ2), (VZ3), (VZ4) and (VZ5), Fig. 1, the entire combustion air quantities may be delivered through valve (VZ6), Fig. 1, into annular (4d6), Fig. 4, through ports (11p), Fig. 4 and into the blast furnace shown in Figs. 1 and 4.

Many combinations of valve adjustments and apparatus regulations are possible by the arrangement of pipes, valves, annulars and ports illustrated in Fig. 4, and all such combinations and adjustments, which permit the blast furnace to function, are included within the adaptations of the process described herein.

With the operating conditions of the gas generators remaining as last described, valves (VY1), (VY2), (VY3), (VY4) and (VY5), Fig. 1, may all be closed and valve (VX1), Fig. 1, opened, whereupon the water gas produced, together with the distillates from the gas generators, are both delivered through pipe (X3), Fig. 1, into annular (4c5), through ports (5p), Fig. 4, into the blast furnace, shown in the drawings. Any adjustments of the valves or apparatus regulations of the blast furnace shown in Fig. 4 with gas quantities so delivered are included within the scope of the process described herein.

With operation of the gas generators continuing as described and presuming the left hand generator shown in Fig. 1 (Fig. 2) to be on gas making run and the other generator to be in blast; close valves (VX1), (VX3), OV') and (OV), Fig. 1, close valve (fv), and open valve (sv), Figs. 1 and 2, also open valve (ev), Fig. 1, leaving valve (ev') closed, whereupon the blast products produced in the right hand generator of Fig. 1 (Fig. 3) follow the same course as that taken before making the adjustments indicated, but the volatiles distilled from the fuel in the magazine of this generator are carried past pipe (x3), Fig. 1, and enter the fuel magazine (A), Fig. 2, through pipe (p), Figs. 1 and 2. The steam supply, being discontinued from pipe (f), Figs. 1 and 2, it is now delivered through pipe (s) Figs. 1 and 2, into fuel magazine (A), Fig. 2.

Thus, the volatiles from the right hand generator, together with the steam for the water gas reaction, journey downward through fuel magazine (A), Fig. 2, through the incandescent carbon atop grate (c), Fig. 2, and exit from the left hand generator through pipe (e), and valve (ev), Fig. 1, now open, and arrive at the base of pipe (y), Fig. 1, as an enriched water gas, containing hydrocarbons from the fuel volatile and carbon monoxide and hydrogen from the reaction of fixed and precipitated carbon from the fuel with steam, the whole being heat treated by passage through incandescent fuel, where further carbon precipitations, which may occur, are made in the hot fuel and reclaimed in the combustion or reaction incident to water gas production.

To reverse the air blast to the other generator, close valves (dv'), Figs. 1 and 3 and open valve (dv), Figs. 1 and 2, throw stack damper (nv), Figs. 1 and 2, to the vertical and stack damper (nv'), Figs. 1 and 3, to the horizontal, close valve (ev) Fig. 1, and open valve (ev') Fig. 1, and close steam valve (sv) Figs. 1 and 2, and open steam valve (sv') Figs. 1 and 3. Any operatable combinations of valves, pipes, annulars and ports shown in Fig. 4 for use with combustible gas so composed and delivered are included within the scope of the process disclosed.

The mechanism shown in the drawings is operatable by many methods, all of which are within the scope of the subject process of this specification. The apparatus shown in the drawings, constitutes but one of the mechanical arrangements by which the said process may function, and any departures therefrom or any mechanical means whatsoever by which the said process may function, are included within the scope of the process claims.

However, it will be noted that applicant's method consists broadly in the generation of hydrogen and carbon monoxide in the generator $a$ and in the production of volatile fractions of bituminous material in the generator $a'$ and then in selectively introducing the hydrogen and carbon monoxide (or water gas, steam having been introduced during the generation of the carbon monoxide and hydrogen), and the volatile fractions at desired points in the smelting or reducing zone of the blast furnace with which both generators communicate.

It should likewise be noted that in applicant's process fuel is constantly introduced, not into the blast furnace, but into the respective generator, and as soon as one generator $a$ has finished producing water gas the other generator $a'$ will have finished its production of volatile fractions and the operations in each generator may then be reversed so that the smelting or reduction of the ore will be continuous. The water gas produces the necessary reaction with the ore when introduced into the reducing zone, and the required heat needed to produce the reaction may be obtained by combusting the gases or volatile fractions which have also been introduced into the smelting zone.

If but a single generator is utilized, same will produce the water gas intermittently and will produce volatile fractions of bituminous material in the periods between periods of generation of water gas and, by the use of a reservoir for storing one or the other of these products, a continuous and simultaneous introduction of the water gas and volatile fractions into the reducing zone will be effected.

What I claim as new and desire to secure by Letters Patent of the United States is:—

1. A process of reducing ore which consists in producing hydrogen and carbon monoxide at a point separated from the reducing zone, distilling volatile fractions of bituminous fuel at a point separated from the reducing zone, and then reducing the ore by introduction of the hydrogen and carbon monoxide within said zone while acquiring the needed reaction, and reducing heats from the burning of the volatile fractions of bituminous fuel by introducing same simultaneously with the carbon monoxide and hydrogen into the reducing zone.

2. A process for the heat treatment of ore which consists in first producing water gas from steam and the potential coke of bituminous fuel, and second, distillation of volatile fractions from such fuel and then introducing the water gas and volatile fractions from their respective sources into the zone of heat treatment thereby to react oxide quantities of the ore with the hydrogen and carbon monoxide of the water gas so obtained, and to produce the required reaction and reducing heats through combustion of the volatile fractions of the fuel.

3. A process for reducing ore which consists in producing water gas and volatile fractions of bituminous materials at points spaced from the ore, by reacting steam and part of the fixed carbon of carbonaceous material into water gas, using a portion of the fixed carbon of a carbonaceous fuel to provide the heat required in producing the gas, and then using the hydrogen and carbon monoxide of the water gas so produced, for reduction of ore, and combusting volatile fractions from the bituminous material employed to supply reaction and reduction heats.

4. A process for reducing ore which consists in converting carbonaceous fuel through the agencies of heat and steam into volatile materials containing hydrocarbons and carbon monoxide and hydrogen, and reducing ore with the carbon monoxide and hydrogen so produced by introducing same into the reducing zone while obtaining the necessary reaction and reducing heats therefor by combusting the hydrocarbons so derived, simultaneously with the introduction of the carbon monoxide and hydrogen.

5. A process for the reducing of ore which consists in deriving volatile fractions from bituminous fuel, in converting part of the fixed carbon of such fuel into water gas through its reaction with steam, and then delivering such respective products into a confined space for the reduction of ore therein contained, and deriving hydrocarbon fractions from such fuel and combusting the same to supply heat requirements of the reducing operation.

6. A process for reducing ore which consists in producing hydrogen and carbon monoxide and volatile hydrocarbon distillates of bituminous material at points spaced from the reducing zone and delivering the hydrogen and carbon monoxide at selected localities into a mass of ore in the reducing zone, and reducing such ore with such gases by reactions to $CO_2$ and $H_2O$ by heat derived from the combustion by a blast of air and hydrocarbons.

7. A process for reducing ore which consists in delivering hydrogen and carbon monoxide at selected localities into a mass of ore, and reducing said ore with the gases by reactions to $CO_2$ and $H_2O$ by heat derived from the combustion, by blasts of air and hydrocarbons, and combusting gases residual from reactions by contact with air quantities supplied.

8. A process for the reducing of ore which consists in deriving volatile fractions from bituminous fuel at one point, in independently converting part of the fixed carbon of this fuel into water gas through its reaction with steam at another point and in then delivering such respective products into a confined chamber, spaced from said first mentioned point and deriving hydrocarbon fractions from such fuel and combusting the same to supply heat requirements of the reducing operation.

9. A process for smelting ore which consists in generating water gas at one point, in producing volatile fractions of bituminous material at another point and in delivering said water gas and said volatile fractions simultaneously into selected localities of a smelting zone thereby to reduce the ore by reaction to the components of the water gas while supplying the necessary smelting heats by combustion of the volatile fractions as continuous process.

10. A process for smelting ore which consists in generating water gas at one point, in producing volatile fractions of bituminous material at another point and in delivering said water gas and said volatile fractions simultaneously into selected localities of a smelting zone thereby to reduce the ore by reaction to the components of the water gas while supplying the necessary smelting heats by combustion of the volatile fractions as a continuous process.

11. A process for smelting ore which consists in combusting part of a quantity of carbonaceous fuel and diverting products of such combustion outside and away from the combustion zone, and during such combustion period distilling volatiles out of and away from carbonaceous fuel superimposed upon the burning fuel, and when a desired incandescent heat is attained therein discontinuing such combustion and then delivering into the incandescent fuel steam and volatiles distilled from carbonaceous fuel, and conducting the gaseous products thereby resulting into selected levels of the smelting zone charged with ore and fluxing material whereby the gaseous materials introduced at one level will act to reduct the ore, and the gaseous materials introduced at another level will act by their combustion with air to produce the required heat.

12. A process for smelting ore which consists in combusting part of a quantity of carbonaceous fuel and diverting products of such combustion outside and away from the combustion zone and during such combustion period distilling volatiles out of and away from carbonaceous fuel superimposed upon the burning fuel and when a desired incandescent heat is attained therein discontinuing such combustion and delivering steam into the incandescent fuel and conveying the gaseous materials thereby resulting and volatiles so derived into selected levels of a smelting zone charged with ore and fluxing material and using the gaseous materials at one level to reduce the ore and the gaseous materials at another level to produce the required heat by combustion with air.

13. A process for smelting ore which consists in combusting part of a quantity of carbonaceous fuel and diverting products of such combustion outside and away from the combustion zone and with heat produced by such combustion distilling volatiles out of and away from carbonaceous fuel and when a desired incandescent heat is attained within the burning fuel discontinuing the combustion and delivering steam thereinto and conveying gaseous materials produced by such steam reaction and distillation into a smelting zone charged with ore and other suitable substances, part of the gaseous materials so derived being introduced at one point to reduce the ore and another part being introduced at another point mixed with air and combusted to produce the required heat.

14. A process for smelting ore which consists in incandescing by air blast, the first of two carbonaceous fuel beds and with heat so produced distilling volatiles from the second fuel bed and conducting volatiles so distilled away from the combustion zone of the first bed and discontinuing the air blast into the first fuel bed and with air substantially excluded delivering steam into said first fuel bed and conducting gases resulting thereby and distillates derived in such manner into contact with ore and combusting part of said gaseous materials with air whereby to heat the ore and react a part of the gaseous materials with the ore to reduce the same.

HAROLD R. BERRY.